(12) United States Patent
Soofi et al.

(10) Patent No.: US 10,408,055 B2
(45) Date of Patent: Sep. 10, 2019

(54) CRUSTAL AND DISTURBANCE FIELD SURVEY CORRECTION

(71) Applicant: CONOCOPHILLIPS COMPANY, Houston, TX (US)

(72) Inventors: Khalid Soofi, Houston, TX (US); Avinash Ramjit, Houston, TX (US); Son V. Pham, Houston, TX (US); Stefan Maus, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 37 days.

(21) Appl. No.: 15/189,409

(22) Filed: Jun. 22, 2016

(65) Prior Publication Data

US 2016/0369625 A1    Dec. 22, 2016

Related U.S. Application Data

(60) Provisional application No. 62/182,655, filed on Jun. 22, 2015.

(51) Int. Cl.

| | |
|---|---|
| *E21B 47/001* | (2012.01) |
| *E21B 47/0232* | (2012.01) |
| *G01V 3/40* | (2006.01) |
| *E21B 49/00* | (2006.01) |
| *E21B 7/04* | (2006.01) |
| *E21B 44/00* | (2006.01) |
| *G01V 3/165* | (2006.01) |

(Continued)

(52) U.S. Cl.
CPC .............. *E21B 49/001* (2013.01); *E21B 7/04* (2013.01); *E21B 7/043* (2013.01); *E21B 44/00* (2013.01); *E21B 47/02224* (2013.01); *G01V 3/165* (2013.01); *G01V 3/40* (2013.01); *G05D 1/0259* (2013.01); *G05D 2201/021* (2013.01)

(58) Field of Classification Search
CPC .. E21B 47/0001; E21B 47/02224; G01V 3/40
USPC .................................................. 324/330, 331
See application file for complete search history.

(56) References Cited

U.S. PATENT DOCUMENTS

| 5,131,155 A | 7/1992 | Takano et al. |
|---|---|---|
| 6,321,456 B1 | 11/2001 | McElhinnney |

(Continued)

FOREIGN PATENT DOCUMENTS

WO    2014176691    11/2014

OTHER PUBLICATIONS

Kinsey et al. Toward high-spatial resolution gravity surveying of the mid-ocean ridges with autonomous underwater vehicles; Oceans 2008; 1-10, Sep. 15, 2008. [retrieved on Aug. 17, 2016]. Retrieved from the Internet. <URL: http://www.whoi.edu/cms/files/08oceans-1_41284.pdf>. entire document.

(Continued)

*Primary Examiner* — Kenneth L Thompson
(74) *Attorney, Agent, or Firm* — ConocoPhillips Company

(57) ABSTRACT

A system and method for magnetic survey uses an autonomous vehicle configured to traverse over the area in a grid pattern with a magnetometer coupled to the autonomous vehicle and configured to obtain magnetic measurements at a controlled rate, the magnetometer obtaining a uniform sampling of the magnetic measurements in each grid of the grid pattern; and a processor configured to obtain the magnetic survey based on the magnetic measurements.

20 Claims, 4 Drawing Sheets

(51) Int. Cl.
    *G05D 1/02*     (2006.01)
    *E21B 47/022*   (2012.01)

(56) References Cited

U.S. PATENT DOCUMENTS

| | | | |
|---|---|---|---|
| 6,871,410 B1 | 3/2005 | Le Jeune | |
| 8,185,312 B2 | 5/2012 | Ekseth et al. | |
| 9,146,225 B2 * | 9/2015 | Pottorf | G01V 9/007 |
| 9,563,203 B2 * | 2/2017 | Davoodi | G05D 1/0088 |
| 2010/0225313 A1 | 9/2010 | Blanz | |
| 2013/0222115 A1 * | 8/2013 | Davoodi | H04Q 9/00 340/10.1 |
| 2014/0354284 A1 * | 12/2014 | Pai | G01V 3/165 324/345 |
| 2017/0254915 A1 * | 9/2017 | Pai | E21B 47/0001 |

OTHER PUBLICATIONS

International Search Report for related case, App. No. PCT/US2016/038698, dated Sep. 7, 2016.

* cited by examiner

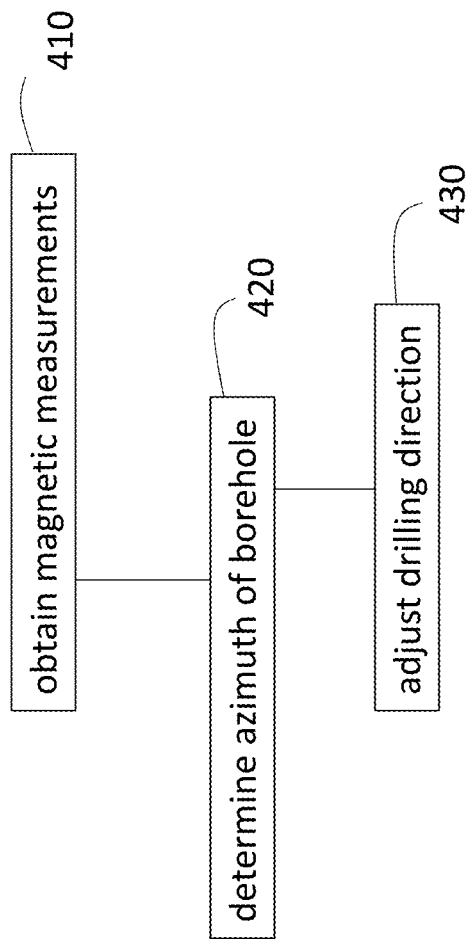

CRUSTAL AND DISTURBANCE FIELD SURVEY CORRECTION

CROSS-REFERENCE TO RELATED APPLICATION

This application is a non-provisional application which claims benefit under 35 USC § 119(e) to U.S. Provisional Application Ser. No. 62/182,655 filed Jun. 22, 2015, entitled "CRUSTAL AND DISTURBANCE FIELD SURVEY CORRECTION," which is incorporated herein in its entirety.

FIELD OF THE INVENTION

This invention relates to magnetic field mapping and, more specifically, to crustal and disturbance field survey correction.

BACKGROUND OF THE INVENTION

In subsurface and sub-seabed drilling operations, knowledge of the magnetic field direction and strength is important in determining drilling direction. The earth's magnetic field (geomagnetic field) direction and strength differs based on location, time, and the total magnetic field measured at any given point is additionally affected by any local formations and anomalies that include magnetic material. A global magnetic model based on a survey may be used as a reference, but this survey may not be updated for years. Thus, an aeromagnetic survey may be conducted in the specific area where drilling is to occur. The aeromagnetic survey involves using a magnetometer on or towed by an aircraft and results in an aeromagnetic survey map that may be more up-to-date than the global magnetic model.

SUMMARY OF THE INVENTION

In one embodiment, continuous control of drilling is based on a real-time on-site magnetic survey of the area using an autonomous vehicle configured to traverse over the area; a magnetometer coupled to the autonomous vehicle and configured to obtain magnetic measurements at a controlled rate, the magnetometer obtaining a uniform sampling of the magnetic measurements over the area; a processor configured to obtain the magnetic survey from the magnetic measurements; and a controller configured to control a drill bit based on the magnetic survey.

In another embodiment, drilling is continuously controlled based on a real-time on-site magnetic survey of the area, where magnetometer is mounted on an autonomous vehicle configured to traverse over the area; magnetic measurements are obtained at a controlled rate using the magnetometer, including a uniform sampling of the magnetic measurements for the area; obtaining, using a processor, the magnetic survey from the magnetic measurements; and controlling a drill bit based on the magnetic survey.

In an additional embodiment, a system for magnetic survey uses an autonomous vehicle configured to traverse over the area in a grid pattern with a magnetometer coupled to the autonomous vehicle and configured to obtain magnetic measurements at a controlled rate, the magnetometer obtaining a uniform sampling of the magnetic measurements in each grid of the grid pattern; and a processor configured to obtain the magnetic survey based on the magnetic measurements.

Measurements may be made using one or more magnetometers attached to one or more autonomous vehicles, including attaching a magnetometer to a second autonomous vehicle and controlling the second autonomous vehicle to traverse a circular path.

One or more vehicles may obtain one or more magnetic surveys, including obtaining magnetic measurements over a circular path repeatedly. Additional sets of magnetic measurements may be obtained to provide a disturbance field. Additionally, magnetic measurements may provide a crustal field.

In another embodiment the magnetic measurements is done continuously at a controlled rate and while controlling the drill bit is done continuously based on the magnetic survey resulting from the obtaining the magnetic measurements.

BRIEF DESCRIPTION OF THE DRAWINGS

The invention, together with further advantages thereof, may best be understood by reference to the following description taken in conjunction with the accompanying figures by way of example and not by way of limitation, in which:

FIG. 4 is a process flow of a method of controlling drilling based on magnetic measurements according to embodiments of the invention.

DETAILED DESCRIPTION OF THE INVENTION

As noted above, in drilling operations, knowledge of the earth's magnetic field strength and direction facilitates accurate drilling. As also noted, a global magnetic model may provide a reference, but the information may be outdated and may not provide detailed information for the area of interest. An aeromagnetic survey may be conducted to obtain a more accurate magnetic field survey, but the procedure involved can be costly and is impractical as a continuous procedure during the drilling process. Embodiments of the systems and methods described herein relate to controlling drilling direction based on continually updating a magnetic field survey grid obtained on-site and in real-time at the drilling location using one or more autonomous marine vehicles. Specifically, the disturbance field and the crustal field are measured to determine on-site geomagnetic properties. While the subsea drilling environment is discussed for exemplary purposes, the systems and methods discussed herein may be adapted for sub-surface drilling, as well.

Figure 1:
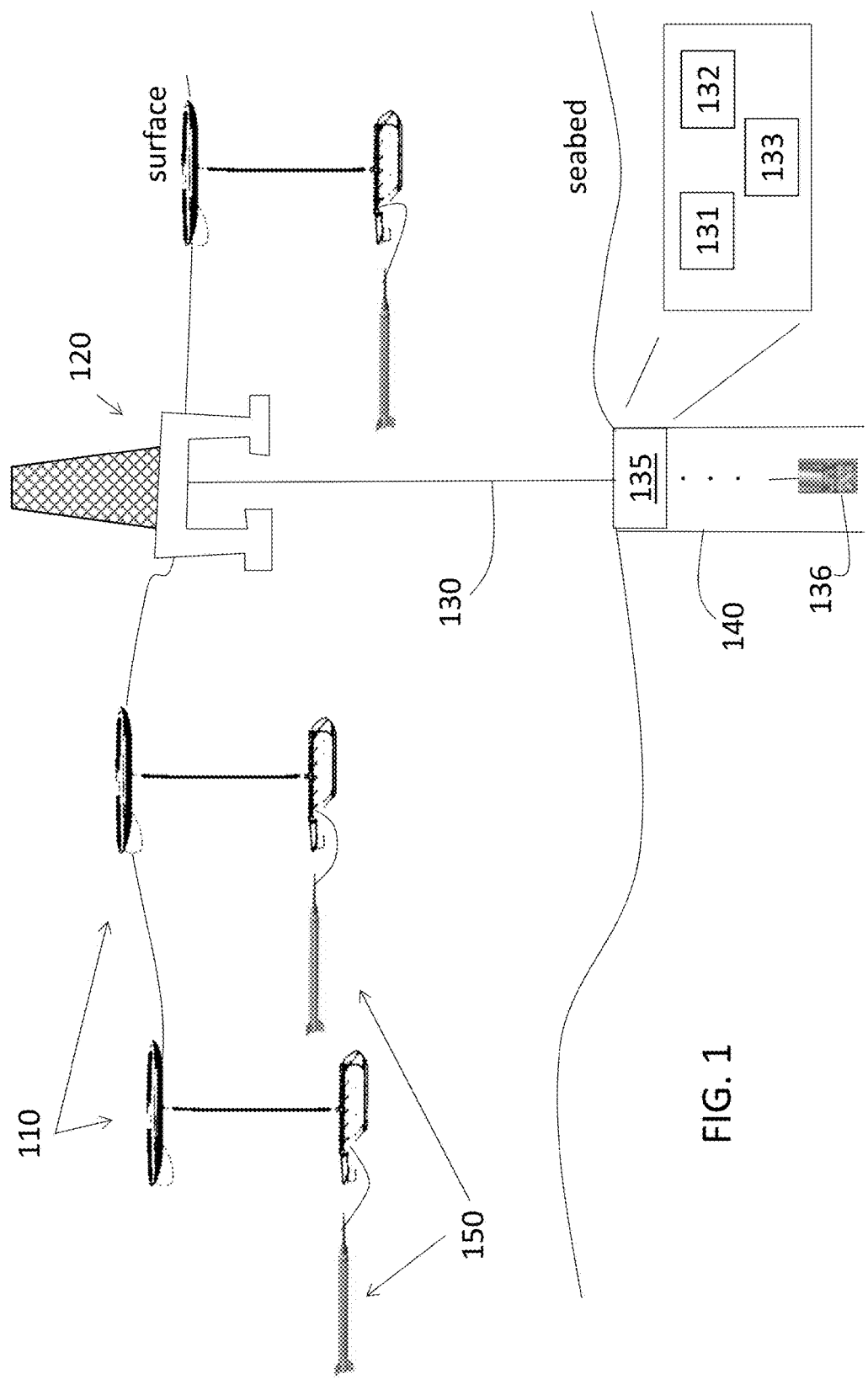
FIG. 1 is a cross-sectional view of a subsea drilling operation according to embodiments of the invention.

FIG. 1 is a cross-sectional view of a subsea drilling operation according to embodiments of the invention. A platform 120 is shown with a carrier 130 extending into a sub-seabed borehole 140. While the exemplary platform 120 in FIG. 1 is a semi-submersible platform, the platform 120 according to the embodiments descried herein may be fixed, submersible, vertically moored or any other type of platform. As noted above, the drilling may alternatively be sub-surface drilling rather than sub-seabed drilling such that the platform is on land. The carrier 130 is a drill string and may convey tools and sensors into the borehole 140 that are used for navigation and exploration in addition to conveying the drilling subsystem. A controller 135, which is shown in the borehole 140 but may alternately be located at the platform 120, controls the drilling operation and, in particular, the direction of drilling by the drill bit 136. The controller 135 includes one or more memory devices 131, one or more processors 132, and a communication module 133 to communicate (e.g., via telemetry over the carrier 130) with components on the platform 120 or elsewhere. One or more autonomous vehicles 110 are used to obtain the in situ real-time magnetic measurements as further detailed below. Each autonomous vehicle 110 is shown towing a magnetometer 150. As discussed with reference to FIG. 3 below, each autonomous vehicle 110 may tow more than one magnetometer 150. Based on the magnetic survey conducted by the magnetometer 150 towed by the autonomous vehicle 110, the controller 135 adjusts drilling direction.

Specifically, in a base station mode, the disturbance field is measured by one or more magnetometers 150 towed by one or more autonomous vehicles 110 that encircle a relatively small radius to achieve an equivalent stationary magnetic measurement. In a survey mode, the crustal (geological) field is measured by one or more magnetometers 150 towed by one or more autonomous vehicles 110 that obtain a continuous magnetic measurement in a predetermined pattern (e.g., grid pattern 210, FIG. 2). These real-time on-site measurements are used to correct the drilling direction by the drill bit 136 based on correcting survey information that indicates magnetic north, which is used to determine the azimuth of the borehole 140.

Figure 2:
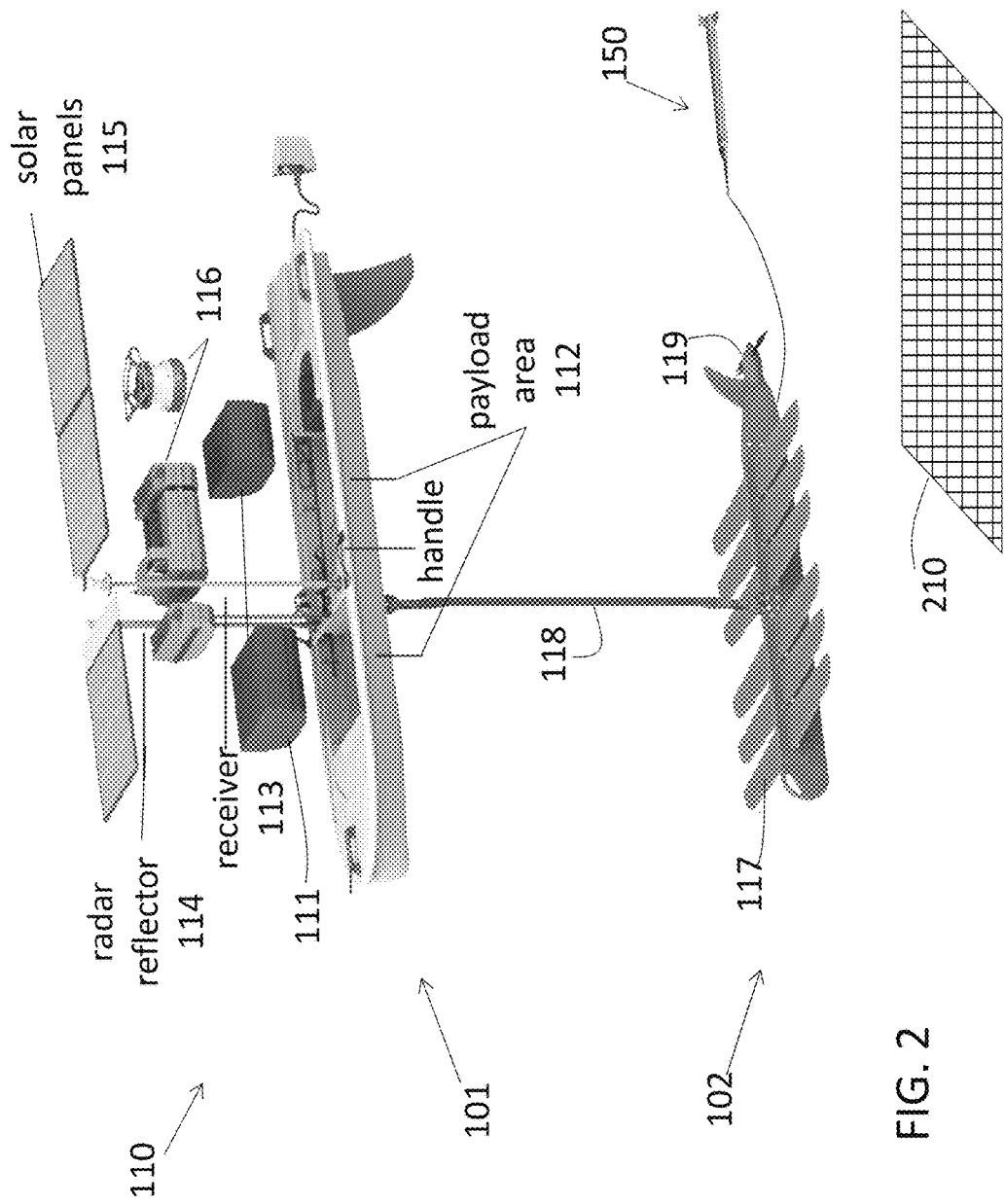
FIG. 2 details an exemplary autonomous vehicle and magnetometer to obtain magnetic measurements according to embodiments of the invention.

FIG. 2 details an exemplary autonomous vehicle 110 and magnetometer 150 to obtain magnetic measurements according to embodiments of the invention. The autonomous vehicle 110 includes payload areas 112 that hold a variety of payloads 111. Among other equipment for navigation and information gathering, the autonomous vehicle 110 also includes a receiver 113 (e.g., automatic identification system (AIS) receiver), a radar reflector 114 that helps to locate the autonomous vehicle 110, solar panels 115 to generate power onboard, and other components 116. These other components 116 may include an acoustic Doppler current profiler (ADCP) that measure water velocity, other payload, and electronics for command and control tasks. The electronics may include one or more memory devices and one or more processors. The other components 116 may also include communications capability such that information gathered by the autonomous vehicle 110 is transmitted to a base station on the water surface or on land for further processing. An umbilical cord 118 carries power and communication between the surface portion 101 of the autonomous vehicle 110 and the mobile portion 102 of the autonomous vehicle 110. The mobile portion 102 of the autonomous vehicle 110 includes wings 117 and a thruster 119. The direction of motion may be communicated to the mobile portion 102 over the umbilical cord 118. The autonomous vehicle 110 tows a magnetometer 150 in the exemplary embodiment shown in FIG. 2. As the autonomous vehicles 110 moves and tows the magnetometer 150 through the water, the magnetometer 150 collects magnetic field strength and direction measurements. As noted above, different autonomous vehicles 110 may tow one or more magnetometers 150 in a circular pattern (base station mode) or predetermined pattern (survey mode). The survey mode may result in measurements obtained in the grid pattern 210, for example. A uniform number of samples of magnetic field measurements are obtained by the magnetometer 150 for each subset (square) of the grid 210. The rate at which samples are obtained and the speed of the autonomous vehicle 110 towing the magnetometer 150 determines the density of samples within each subset of the grid 210. Both the rate of sampling and the speed of the autonomous vehicle 110 may be controlled based on a preset control or in real-time.

Figure 3:
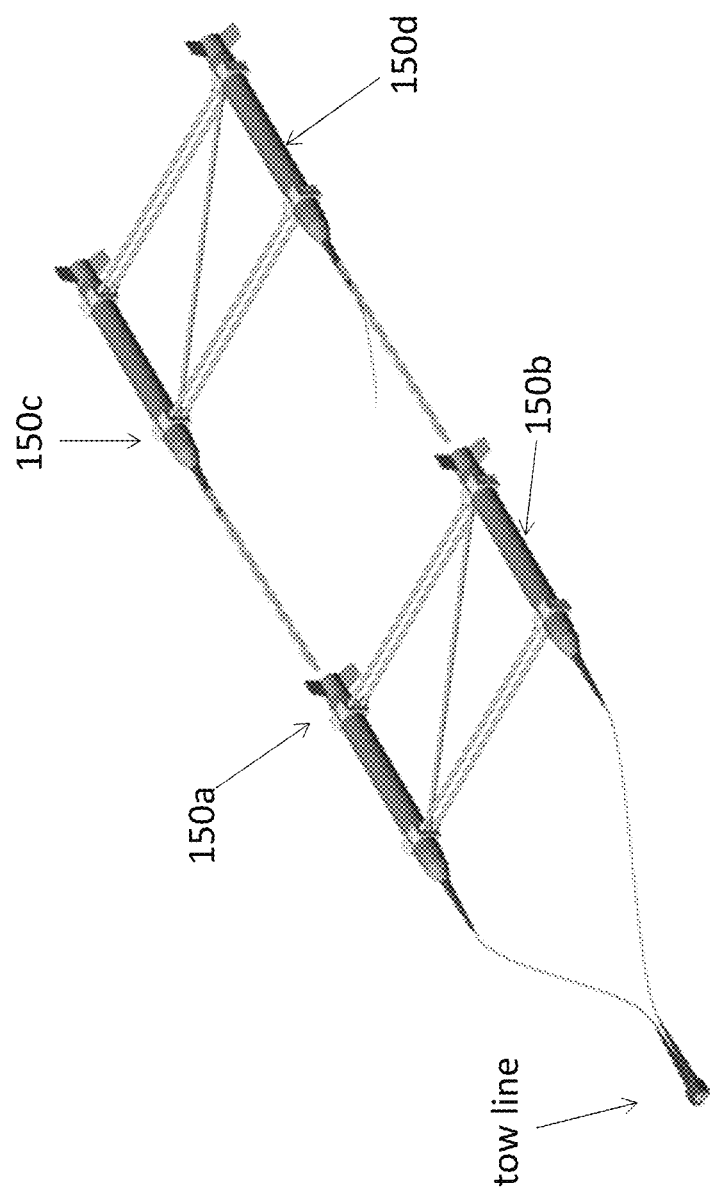
FIG. 3 illustrates an exemplary arrangement of magnetometers according to an embodiment of the invention.

FIG. 3 illustrates an exemplary arrangement of magnetometers 150 according to an embodiment of the invention. As shown, four magnetometers 150a, 150b, 150c, 150d are braced together to be towed (via a tow line) by the autonomous vehicle 110. In alternate embodiments, only magnetometers 150a, 150b may be present, for example or only magnetometer 150a. The arrangement of multiple magnetometers 150 may be used to increase the density of the magnetic measurement samples in the grid 210 in the survey mode or to increase the coverage area (size of the grid 210 or base station). The measurements obtained by the magnetometers 150 may be transmitted via the tow line (from the magnetometers 150 to the mobile portion 102 through the umbilical cord 118 to the surface portion 101) or in another known manner to the autonomous vehicle 110. The autonomous vehicle 110 may process the measurements or transmit the measurements to the platform 120 or elsewhere to be used to control drilling via the controller 135.

FIG. 4 is a process flow of a method of controlling drilling based on magnetic measurements according to embodiments of the invention. At block 410, obtaining magnetic measurements (crustal field) includes using one or more autonomous vehicles 110 towing one or more magnetometers 150 to obtain a uniform sampling of magnetic measurements over a grid 210 in the area of interest for drilling. Obtaining the measurements (disturbance field) additionally includes using one or more autonomous vehicles 110 towing one or more magnetometers 150 while encircling a relatively small radius. The magnetic measurements are used to determine azimuth of the borehole 140 or current drilling direction at block 420. Based on this information, the controller 135 adjusting drilling direction, at block 430, includes the controller 135 changing direction of drilling by the drill bit 136 as needed. Specifically, the controller 135 may compare the predicted or estimated location of the drill bit 136 with the actual location of the drill bit 136 (based on the azimuth determined by the magnetic measurements) in order to determine how (if at all) to move the drill bit 136 to follow a predetermined path or a path that is indicated by other sensors (e.g., porosity sensor). The processes at blocks 410 through 430 may be implemented iteratively and continually, thereby providing continuous feedback control of the drill bit 136 direction.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system to continuously control drilling in an area based on a real-time on-site magnetic survey of the area, the system comprising:

an autonomous vehicle operable to traverse over a predetermined area;
a magnetometer coupled to the autonomous vehicle and operable to obtain magnetic measurements at a controlled rate, the magnetometer obtaining a uniform sampling of the magnetic measurements over the predetermined area;
a processor configured to obtain the magnetic survey from the magnetic measurements and determine the azimuth of a borehole formed within a subterranean formation; and
a controller operably coupled with a drill string, the controller operable to continuously adjust a drill bit disposed on the drill string based on the azimuth of the borehole as determined by the magnetic survey, wherein the controller operably adjusts the drill bit to a predetermined well path.

2. The system according to claim 1, wherein the predetermined well path is determined by one or more sensors.

3. The system according to claim 2, wherein the one or more sensors are porosity sensors.

4. The system according to claim 1, further comprising a second autonomous vehicle configured to traverse a circular path.

5. The system according to claim 4, further comprising a second magnetometer coupled to the second autonomous vehicle and configured to obtain another set of magnetic measurements over the circular path.

6. The system according to claim 5, wherein the another set of magnetic measurements indicates a disturbance field.

7. The system according to claim 5, wherein the controller controls the drill bit based additionally on the another set of magnetic measurements.

8. The system according to claim 1, wherein the magnetic measurements indicate a crustal field.

9. The system according to claim 1, further comprising one or more other magnetometers coupled to the autonomous vehicle.

10. The system according to claim 1, wherein the magnetometer is configured to continuously obtain the magnetic measurements at the controlled rate, and the controller continuously controls the drill bit based on the magnetic survey resulting from the magnetic measurements.

11. A method of continuously controlling drilling in an area based on a real-time on-site magnetic survey of the area, the method comprising:
coupling a magnetometer to an autonomous vehicle configured to traverse over a predetermined area;
obtaining magnetic measurements at a controlled rate using the magnetometer, the obtaining including obtaining a uniform sampling of the magnetic measurements for the area;
obtaining, using a processor, the magnetic survey from the magnetic measurements determining an azimuth of a borehole; and
adjusting a drill bit based on the azimuth of the borehole as determined by the magnetic survey, wherein the controller is operably coupled with the drill bit and operable to continuously adjust the drill bit to a predetermined well path.

12. The method according to claim 11, wherein the predetermined well path is determined by one or more sensors.

13. The method according to claim 12, wherein the one or more sensors are porosity sensors.

14. The method according to claim 11, further comprising:
coupling a second magnetometer to a second autonomous vehicle and controlling the second autonomous vehicle to traverse a circular path.

15. The method according to claim 14, further comprising:
obtaining another set of magnetic measurements over the circular path.

16. The method according to claim 15, wherein the obtaining the another set of magnetic measurements provides a disturbance field.

17. The method according to claim 11, wherein the obtaining the magnetic measurements provides a crustal field.

18. The method according to claim 11, wherein the obtaining the magnetic measurements is done continuously at the controlled rate and the controlling the drill bit is done continuously based on the magnetic survey resulting from the obtaining the magnetic measurements.

19. The method according to claim 11, further comprising:
coupling one or more other magnetometers to the autonomous vehicle.

20. A system to obtain a magnetic survey for an area, the system comprising:
an autonomous vehicle operable to traverse over a predetermined area in a grid pattern;
a magnetometer coupled to the autonomous vehicle and operable to obtain magnetic measurements at a controlled rate, the magnetometer obtaining a uniform sampling of the magnetic measurements in each grid of the grid pattern;
a processor operable to obtain the magnetic survey based on the magnetic measurements and determine the azimuth of a borehole formed within a subterranean formation; and
a controller operably coupled with a drill string to continuously adjust a drill bit disposed on the drill string based on the azimuth of the borehole determined by the magnetic survey, wherein the controller operably adjust the drill string to a predetermined well path.

* * * * *